United States Patent
Yamanaka

(10) Patent No.: US 8,331,208 B2
(45) Date of Patent: Dec. 11, 2012

(54) INFORMATION READOUT DEVICE AND INFORMATION READOUT METHOD

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 349 days.

(21) Appl. No.: 12/530,721

(22) PCT Filed: Feb. 8, 2008

(86) PCT No.: PCT/JP2008/052181
§ 371 (c)(1),
(2), (4) Date: Dec. 7, 2009

(87) PCT Pub. No.: WO2008/111346
PCT Pub. Date: Sep. 18, 2008

(65) Prior Publication Data
US 2010/0097910 A1    Apr. 22, 2010

(30) Foreign Application Priority Data
Mar. 13, 2007    (JP) .................................. 2007-063070

(51) Int. Cl.
*G11B 20/10*    (2006.01)
(52) U.S. Cl. ............... 369/59.22; 369/59.17; 369/59.19; 369/59.27
(58) Field of Classification Search ............... 369/59.17, 369/59.19–59.27
See application file for complete search history.

(56) References Cited

U.S. PATENT DOCUMENTS

| | | | | |
|---|---|---|---|---|
| 2002/0060827 A1* | 5/2002 | Agazzi | ........................... | 359/161 |
| 2005/0058302 A1* | 3/2005 | Dance et al. | .................. | 381/94.7 |
| 2007/0036211 A1* | 2/2007 | Kajiwara | ...................... | 375/232 |

FOREIGN PATENT DOCUMENTS

| | | |
|---|---|---|
| EP | 1575176 A | 9/2005 |
| JP | 2005071565 A | 3/2005 |
| JP | 2005302130 A | 10/2005 |
| JP | 2005303361 A | 10/2005 |
| JP | 2006313592 A | 11/2006 |

OTHER PUBLICATIONS

International Search Report for PCT/JP2008/052181 mailed Apr. 22, 2008.
V. J. Mathews, "Adaptive Polynomial Filters", IEEE Signal Processing Magazine, Jul. 1991, vol. 8, Issue 3, p. 10-26.

* cited by examiner

*Primary Examiner* — Wayne Young
*Assistant Examiner* — Dionne Pendleton

(57) ABSTRACT

An information readout device includes an equalizer and a maximum likelihood detector. The equalizer includes a second-order Volterra filter, and equalizes a readout signal read out from an information recording medium to a predetermined characteristic to output the equalization signal. The maximum likelihood detector outputs a binary signal through maximum likelihood detection based on the equalization signal. By limiting the number of second-order terms of the second-order Volterra filter to three terms or four terms, a nonlinear component can be effectively corrected.

10 Claims, 5 Drawing Sheets

INFORMATION READOUT DEVICE AND INFORMATION READOUT METHOD

This application is the National Phase of PCT/JP2008/052181, filed Feb. 8, 2008, which is based upon and claims the benefit of priority from Japanese patent application No. 2007-63070 filed Mar. 13, 2007, the disclosure of which is incorporated herein in its entirety by reference.

TECHNICAL FIELD

The present invention relates to an information readout device and an information readout method, and more specifically to an information readout device and an information readout method for processing a signal including a nonlinear component read out from an information recording medium.

BACKGROUND ART

An existing device that reads a signal from an information recording medium such as a hard disc device or an optical disc device detects an information signal binarized through signal processing such as wave form equalization under the assumption that the signal read from the information recording medium has a substantially linear characteristic.

In recent years, following improvement in recording density of the information recording medium, interference between recorded signals ahead and behind has been unable to be disregarded. Thus, a method, in which a readout signal is equalized to multiple levels by using principles of partial response (PR) and a maximum likelihood detection by using a Viterbi detection method is further performed, has been in increasingly wide spread use.

FIG. 1 shows an example of a configuration of such an information readout device. This information readout device 80 includes: a PLL circuit 82, a transversal filter 84, and a Viterbi detector 86. For a signal read out from a recording medium, a clock is extracted at the PLL circuit 82, and a readout signal is equalized to a desired PR class by the transversal filter 84 that performs linear equalization. For example, in a case of PR121, the readout signal is equalized to five multiple levels. The Viterbi detector 86 performs the maximum likelihood detection on the equalization signal outputted from the transversal filter to read out a so-called probable binary signal group which is the closest to a signal group of an ideal waveform in consecutive equalization signal groups.

Where a tap length is n, the transversal filter can be expressed as follows.

$$y(k) = \sum_{i=0}^{n-1} h_1(i) \cdot x(k-i) \tag{1}$$

In formula (1), y (k) is an output signal of the filter at a time k, x (k) is an input signal at the time k, and $h_1$ (i) is a tap coefficient (i=1, 2, 3, n−1). In a typical information readout device, a value of approximately 5 to 10 is used as the tap length. As clear from the formula (1), an equalization characteristic is a linear characteristic in any tap length.

However, in a case where equalization to multiple levels corresponding to a target PR waveform is performed by a linear equalization filter such as a transversal filter, compared to simple equalization to binary values conventionally practiced, a nonlinear characteristic possessed by a readout signal becomes more influential. This is partially attributable to that a linear characteristic in an amplitude direction becomes more important since there are plural threshold values for judging a signal level in a case of the equalization to multiple values whereas there is one such threshold value in a case of the equalization to binary values.

Thus, as one of methods of equalizing a signal having such a nonlinear characteristic, a method using a filter called Volterra filter expressed by a polynomial is suggested. For example, Japanese Laid-Open Patent Application JP-P 2005-303361A, JP-P 2006-313592A, and JP-P 2005-71565A discloses a signal processing device that a Volterra filter equalizes a readout signal read from a recording medium.

As an order of this Volterra filter, a third order and a fourth order are theoretically possible. However, considering tap coefficient stability and circuit complication, a second-order filter can be said to be practical. However, compared to a conventional filter with a linear characteristic only, circuit complication is inevitable. For example, where a tap length of a first-order term of the filter is n, the number of tap coefficients is n, but when a tap length of a second-order term is n, the number of tap coefficients is n×n. In practice, the number of independent tap coefficients is n×(n+1)/2 based on symmetry of diagonal components, but it is clear that more processing is required for the number of the second-order terms than for the number of the first-order term. Therefore, a circuit size, a tap coefficient setting stability, etc. become practical problems.

DISCLOSURE OF INVENTION

An object of the present invention is to achieve an information readout device for performing nonlinear signal processing without causing the problems described above. That is, an object of the present invention is to provide an information readout device and an information readout method for generating a binary signal from a readout signal read out from an information recording medium and including a nonlinear component while preventing circuit and device from being complicated.

In an aspect of the present invention, an information readout device includes an equalizer and a maximum likelihood detector. The equalizer includes a second-order Volterra filter, and equalizes a readout signal read out from an information recording medium to a predetermined characteristic to output the equalization signal. The maximum likelihood detector outputs a binary signal through maximum likelihood detection based on the equalization signal. The information readout device performs calculation while limiting the number of second-order terms included in calculation processing by the second-order Volterra filter to less than five.

The second-order terms included in the calculation processing by the second-order Volterra filter described above may be expressed by three terms:

x(k+1−M)·x(k−M), x(k+1−M)·x(k−1−M), x(k−M)·x(k−1−M), (2)

where x (k) is a signal group in which the readout signal is discretized by time and M is a predetermined fixed number.

Moreover, the second-order terms included in the calculation processing by the second-order Volterra filter described above may be expressed by four terms:

x(k+1−M)·x(k−M), x(k+1−M)·x(k−1−M), $x(k-M) \cdot x(k-M),$ $x(k-M) \cdot x(k-1-M),$ (3)

where x (k) is a signal group in which the readout signal is discretized by time and M is a predetermined fixed number.

In another aspect of the present invention, an information readout method includes: an equalization step and a maximum likelihood detection step. The equalization step includes a Volterra filter step of performing calculation processing by a second-order Volterra filter whose number of second-order terms included in calculation processing is limited to less than five. In the equalization step, a readout signal read out from an information recording medium is equalized to a predetermined characteristic whereby the equalization signal is outputted. In the maximum likelihood detection step, based on this equalization signal, a binary signal that has been binarized through the maximum likelihood detection is outputted.

According to the present invention, an information readout device and an information readout method can be provided which can obtain a binary signal from a nonlinear readout signal from an information recording medium without causing great device complication.

BRIEF DESCRIPTION OF THE DRAWINGS

The above and other objects, advantages and features of the present invention will be more apparent from the following description of certain preferred exemplary embodiments taken in conjunction with the accompanying drawings, in which.

BEST MODES FOR CARRYING OUT THE INVENTION

Figure 1:
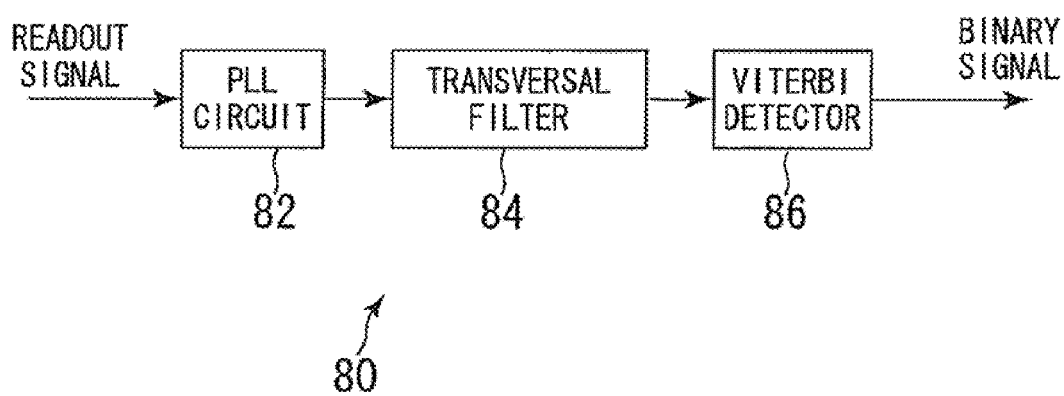
FIG. 1 is a diagram showing a configuration of a conventional information readout device.

Best modes for carrying out the present invention will be described referring to the drawings.

Where a tap length is n, a typical second-order Volterra filter is as follows.

$$y(k) = \sum_{i=0}^{n-1} h_1(i) \cdot x(k-i) + \sum_{j_1=0}^{n-1} \sum_{j_2=0}^{n-1} h_2(j_1, j_2) \cdot x(k-j_1) \cdot x(k-j_2)$$ (4)

In this formula, y (k) is an output signal at a time k, x (k) is an input signal at the time k, $h_1$ (i) is a tap coefficient of a first-order term (i=1, 2, 3, n−1), and $h_2$ ($j_1$, $j_2$) is a tap coefficient of a second-order term ($j_1$=1, 2, 3, n−1; $j_2$=1, 2, 3, n−1).

For the tap coefficients of the second-order terms, the relationship $h_2(j_1, j_2) = h_2(j_i)$ holds. Therefore, the number of independent tap coefficients is n×(n+1)/2 which is smaller than n×n, but it is obviously still much larger than the n-number of tap coefficients of the first-order term.

This second-order Volterra filter can be operated in such a manner as to individually optimize the tap coefficients thereof based on an adaptive equalization algorism. This is the same as that tap coefficients of a transversal filter are optimized based on a least-square method.

In a conventional linear equalizer, for the tap length of the first-order term, a value of approximately 5 to 10 is used. If the tap length is 5, it means that for a signal at a certain time, interference by signals at two times ahead and signals at two times behind in a temporal sequence are considered.

In a case of the second-order Volterra filter, when the tap length of the first-order term is 5, the number of tap coefficients of the second-order terms is n×(n+1)/2, and thus 15 tap coefficients are required considering symmetry. As a possible method of reducing this number of tap coefficients of the second-order terms, it is first considered that the tap length is more limited than that of the first-order term. For example, when the tap length is 3 including one each ahead and behind, the number of tap coefficients of the second-order terms is 6. This is still larger than the number of tap coefficients of the first-order term.

However, detailed investigation by the inventor on the actual readout signal from the recording medium has proved that a large portion of a nonlinear component can be corrected by selecting specific, second-order terms.

Figure 2:
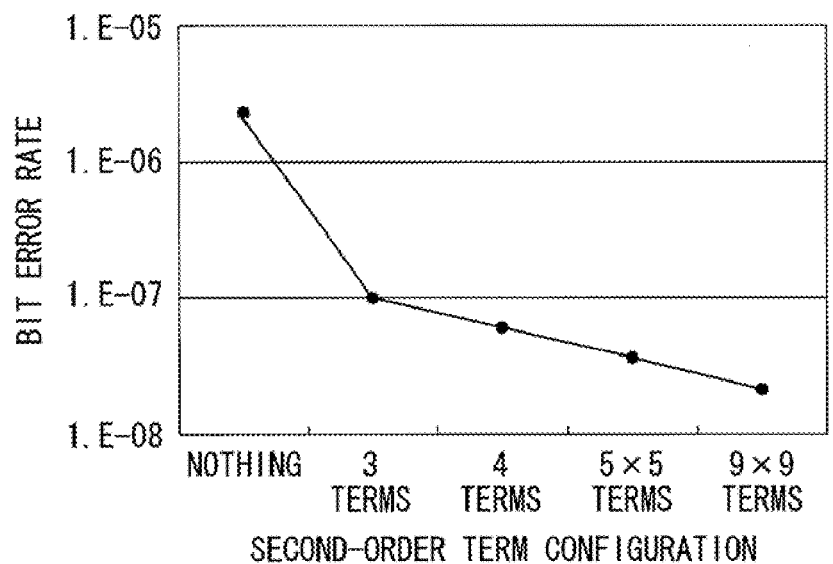
FIG. 2 is a diagram showing relationship between a bit error rate of a readout signal and a method of selecting a second-order term of a second-order Volterra filter.

FIG. 2 is a diagram showing results of measurement on how, in processing of binarizing a readout signal from an optical disc medium by performing PR equalization and Viterbi detection thereon, a bit error rate of the readout signal changes depending on selection of second-order terms of a second-order Volterra filter used for equalization. As a PR class, equalization to PR12221 is performed. Therefore, the readout signal has a bit error rate under a condition that there is interference by codes at two times ahead and codes at two times behind. A code group of the readout signal is a 1-7 modulation code with a shortest mark length of 2T and a longest mark length of 7T where a unit of time is T.

At this point, the tap length n=11, and the number of first-order terms is 11, which is fixed, in all measurement conditions. Examples are illustrated in which one example is theta second-order term is absent and other four examples are that second-order terms are added. The four conditions include: a case where three second-order terms are selectively added, a case where four second-order terms are selectively added, a case where 5×5 second-order terms are added, and a case where 9×9 second-order terms are added.

In the second-order term configuration with 9×9 terms, $j_1$ and $j_2$ of the second-order terms are limited to 1 to 9, and the second-order terms as:

$$\sum_{j_1=1}^{9} \sum_{j_2=1}^{9} h_2(j_1, j_2) \cdot x(k-j_1) \cdot x(k-j_2)$$ (5)

are added to the first-order terms.

In the second-order term configuration with 5×5 terms, $j_1$ and $j_2$ of the second-order terms are limited to 3 to 7, and the second-order terms as:

$$\sum_{j_1=3}^{7}\sum_{j_2=3}^{7} h_2(j_1, j_2) \cdot x(k-j_1) \cdot x(k-j_2) \quad (6)$$

are added to the first-order terms.

In the second-order term configuration with four terms, the following four terms:

$$h_2(4,5) \cdot x(k-4) \cdot x(k-5) + h_2(4,6) \cdot x(k-4) \cdot x(k-6) + \quad (7)$$
$$h_2(5,5) \cdot x(k-5) \cdot x(k-5) + h_2(5,6) \cdot x(k-5) \cdot x(k-6)$$

are chosen as the second-order terms and added to the first-order terms.

In the second-order term configuration with three terms, the following three terms:

$$h_2(4,5) \cdot x(k-4) \cdot x(k-5) + \quad (8)$$
$$h_2(4,6) \cdot x(k-4) \cdot x(k-6) + h_2(5,6) \cdot x(k-5) \cdot x(k-6)$$

are chosen as the second-order terms and added to the first-order terms.

When the condition where only the first-order terms are present while no second-order terms are present, a bit error rate was approximately $2 \times 10^{-6}$. In the condition where the three second-order terms are added to the first-order terms, the bit error rate is already $1 \times 10^{-7}$. Thus, compared to the bit error rate is $2 \times 10^{-6}$ in the condition where only the first-order terms are present, the characteristic improvement can be achieved in one or more digit. Further, even when the number of second-order terms added to the first-order terms is increased to more than 3, a degree of a bit error rate improvement is small. Therefore, practically, considering balance between a circuit size and a characteristic improvement effect, it is clearly enough to add three or four second-order terms to the first-order terms.

Figure 3:
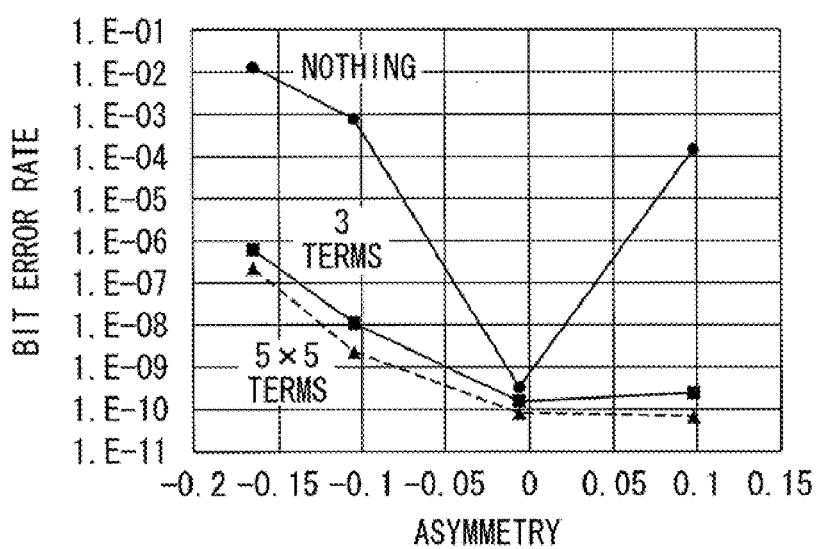
FIG. 3 is a diagram illustrating bit error rate change due to a difference in an equalization method.
Figure 4:
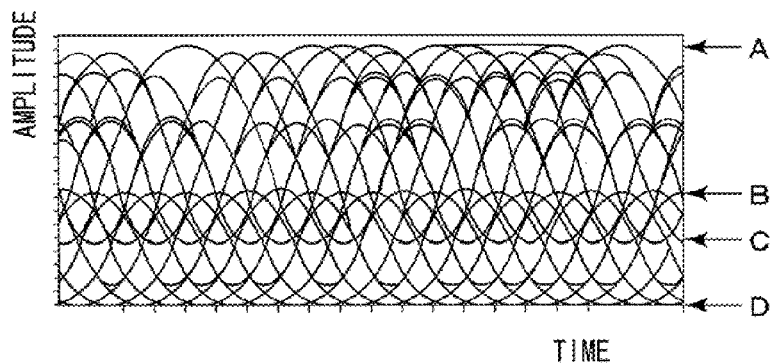
FIG. 4 is a diagram showing signal eye patterns.

FIG. 3 shows an example of measured bit error rate change due to a difference in an equalization formula. It is an example of measured bit error rates depending on a difference in the equation formula with respect to asymmetry shift, as a nonlinear characteristic, that most frequently occurs as a readout signal from the optical disc medium. Signal detection condition in the measurement is the same as that of the measurement in FIG. 2. In signal eye patterns as shown in FIG. 4, where an upper envelope is A, a lower envelope is D, an upper envelop of a minimum amplitude signal is B, and a lower envelope of the minimum amplitude signal is C, a value of the asymmetry of the readout signal is a value defined as:

[(A+D)/2−(B+C)/2]/(A−D)  (9)

which is an index indicating vertical asymmetry of signal amplitude.

FIG. 3 proves that, in a situation where no asymmetry occurs, a sufficient bit error rate is obtained with only the first-order terms. However, an occurrence of asymmetry results in an error rate of $1 \times 10^{-4}$ or more, which is great deterioration. On the contrary, only adding three second-order terms results in great improvement, providing a feasible characteristic of $1 \times 10^{-6}$ or less. Furthermore, it can be seen that this characteristic does not make much difference in any asymmetry condition from that in a case where 5×5 terms are added as the second-order terms.

Therefore, it has been clarified that effect of selectively adding a small number of second-order terms is valid for a wide range of nonlinear characteristics. It is understood that this is attributable to that nonlinear components included in the signal group read out from the information recording medium are mainly located in a narrower range on a time axis than linear components.

For example, where M=5, the formula (8) can be expressed as follows.

$$h_2(M-1, M) \cdot x(k+1-M) \cdot x(k-M) + \quad (10)$$
$$h_2(M-1, M+1) \cdot x(k+1-M) \cdot x(k-1-M) +$$
$$h_2(M, M+1) \cdot x(k-M) \cdot x(k-1-M)$$

This proves that it is only required to use only calculation terms for signals at ±1 times for a reference time (k−M).

Similarly, the formula (7) is:

$$h_2(M-1, M) \cdot x(k+1-M) \cdot x(k-M) + \quad (11)$$
$$h_2(M-1, M+1) \cdot x(k+1-M) \cdot x(k-1-M) +$$
$$h_2(M, M) \cdot x(k-M) \cdot x(k-M) +$$
$$h_2(M, M+1) \cdot x(k-M) \cdot x(k-1-M)$$

which proves that only ±1 times are included.

Needless to say, since there are six second-order terms at the ±1 times, using all of them results in complication. That is, selectively using them starting with the one with a high correction effect as described above enhances the effect of the present invention.

As described above, for the readout signal from the information recording medium, the Volterra filter is capable of practically sufficient nonlinear characteristic equalization by using only three or four second-order terms, providing a favorable binary signal. It can be confirmed that such a characteristic is valid even when the PR class includes PR121, PR1221, and PR3443 or when a code group (for example, 8-16 modulation) such that a shortest mark length is 3T is used, and thus it has been clarified that this characteristic is usually widely applicable.

Figure 5:
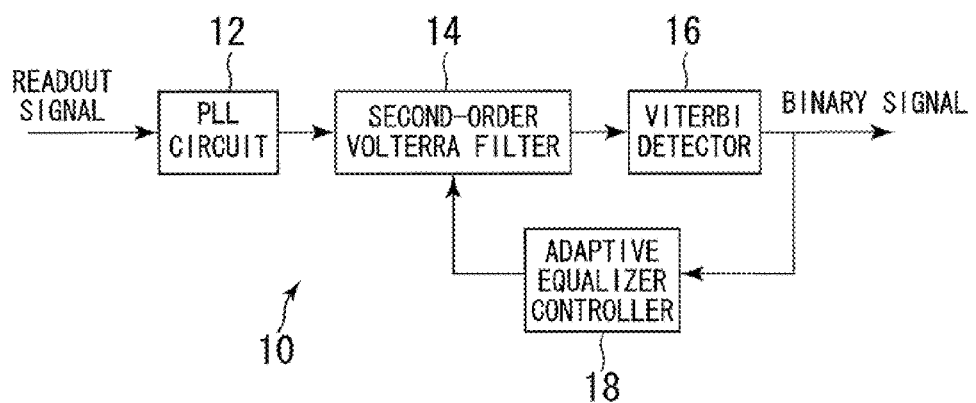
FIG. 5 is a diagram showing an example of a configuration of an information readout device according to an exemplary embodiment of the present invention.

FIG. 5 is a diagram showing an example of a configuration of the information readout device according to an exemplary embodiment of the present invention. The information readout device 10 includes: a PLL circuit 12, a second-order Volterra filter 14, a Viterbi detector 16, and an adaptive equalizer controller 18.

For the readout signal read out from the information recording medium, a clock is extracted by the PLL (Phase locked loop) circuit 12. This clock and the readout signal synchronous to this clock are supplied to the second-order Volterra filter 19, which equalizes the readout signal in correspondence with a desired PR class. The Viterbi detector 16 performs maximum likelihood detection on the equalization signal outputted from the second-order Volterra filter 14, thereby providing a most probable binary signal. Furthermore, to ensure temporal fluctuation in a readout signal characteristic, the adaptive equalizer controller 18 detects a shift of the equalization signal from the binary signal outputted from the Viterbi detector 16 to adjust a tap coefficient of the second-order Volterra filter 14. This also makes it possible to achieve a function of adaptive equalization. For the adaptive equalization, for example, an algorism based on a well known least-square method can be used.

Moreover, this signal processing can also be executed as logic circuit calculation by digitalizing the readout signal through subjecting it to AD conversion, and thus can be mounted as a compact LSI (Large scale integrated circuit).

Figure 6:
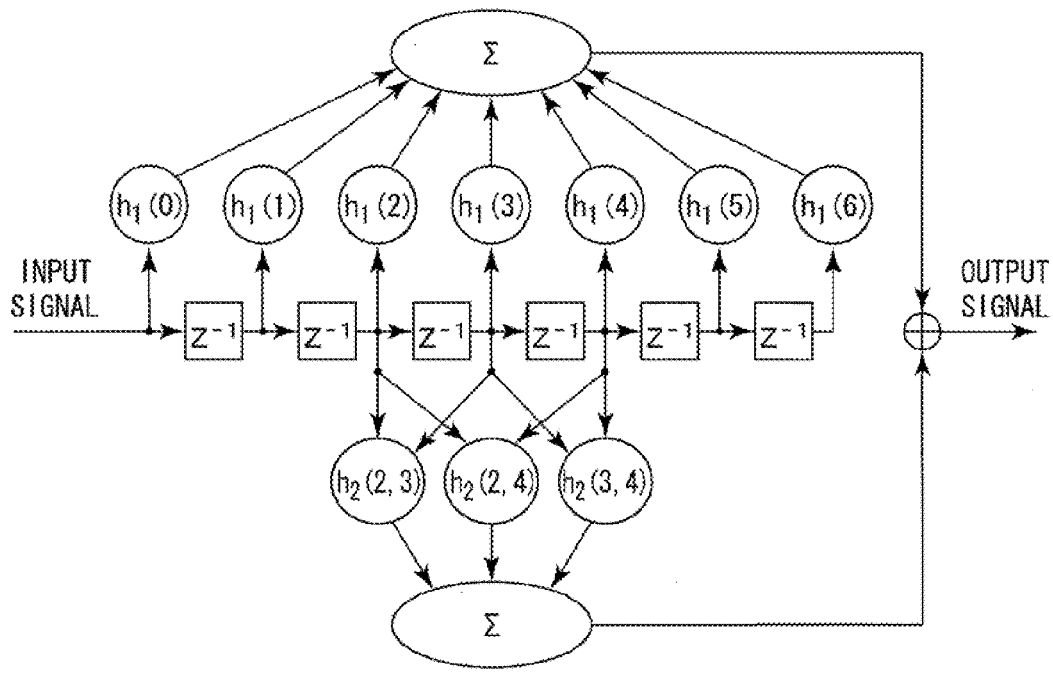
FIG. 6 is a diagram showing an example of a configuration of a filter according to the exemplary embodiment of the present invention.

FIG. 6 is a diagram showing an example of a configuration of the second-order Volterra filter. A case is illustrated in which seven terms are used as the first-order terms and three terms are used as the second-order terms. $Z^{-1}$ indicates a delay element of one time delay, and $\Sigma$ indicates a sum calculation element. In an upper half of the figure, time delay components of the input signal are multiplied by tap coefficients of the first-order terms, i.e., $h_1$ (0) to $h_1$ (6), respectively, thereby obtaining their sum. In a lower half of the figure, the three delay components near a center are multiplied by tap coefficients of the second-order terms, i.e., $h_2$ (2, 3), $h_2$ (2, 4), and $h_2$ (3, 4), thereby obtaining their sum. Finally, the sum of the first-order terms and the sum of the second-order terms are added together to obtain an output signal. Each of the tap coefficients may be variable for the adaptive equalization function.

Figure 7:
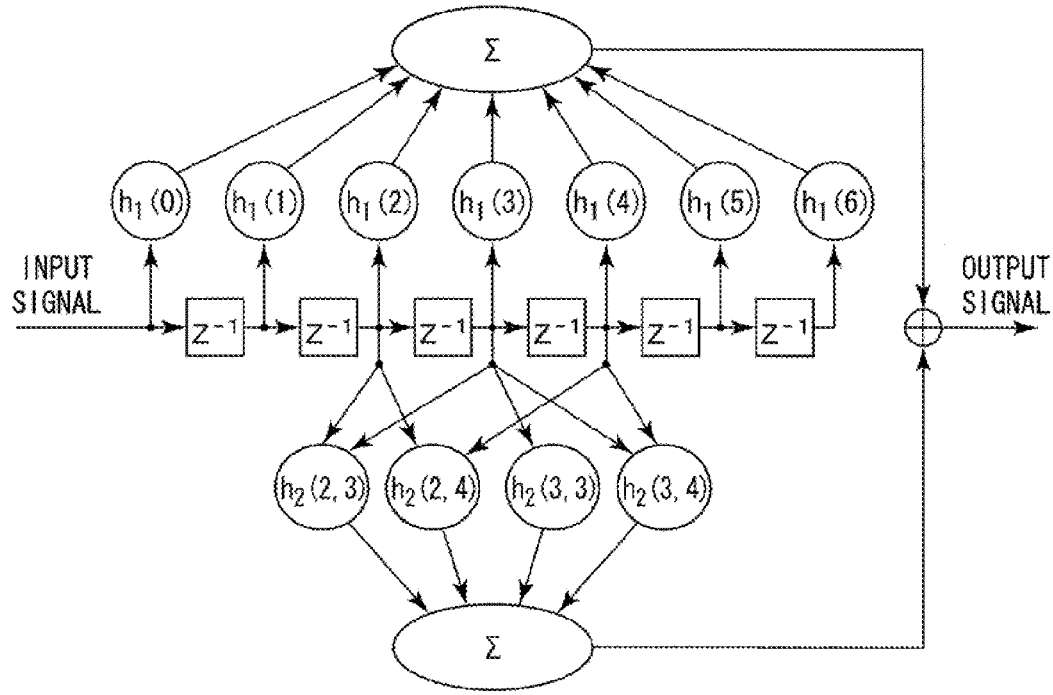
FIG. 7 is a diagram showing an example of a configuration of the filter according to the exemplary embodiment of the present invention.

FIG. 7 is a diagram showing an example of a configuration of the second-order Volterra filter when seven terms are used as the first-order terms and four terms are used as the second-order terms. $Z^{-1}$ indicates a delay element of one time delay, and $\Sigma$ indicates a sum calculation element. In an upper half of the figure, time delay components of the input signal are multiplied by tap coefficients of the first-order terms, i.e., $h_1$ (0) to $h_1$ (6), respectively, thereby obtaining their sum. In a lower half of the figure, the three delay components near a center are multiplied by tap coefficients of the second-order terms, i.e., $h_2$ (2, 3), $h_2$ (2, 4), $h_2$ (3, 3) and $h_2$(3, 4), thereby obtaining their sum. Finally, the sum of the first-order terms and the sum of the second-order terms are added together to obtain an output signal. Each of the tap coefficients may be variable for an adaptive equalization function.

In FIGS. 6 and 7, the delay elements forming the second-order terms do not have to be located at a central part of the delay elements of the first-order terms. Therefore, any location from a right end to a left end can be set, but setting a location as close to the center as possible is desirable for combination of the first-order terms and the second-order terms with a greatest possible effect.

Note that in a case such that influence of intercode interference included in the readout signal is not balanced between a time forward direction and a time backward direction, it is better in some cases to adjust the location where the second-order terms are formed based on the influence.

Figure 8:
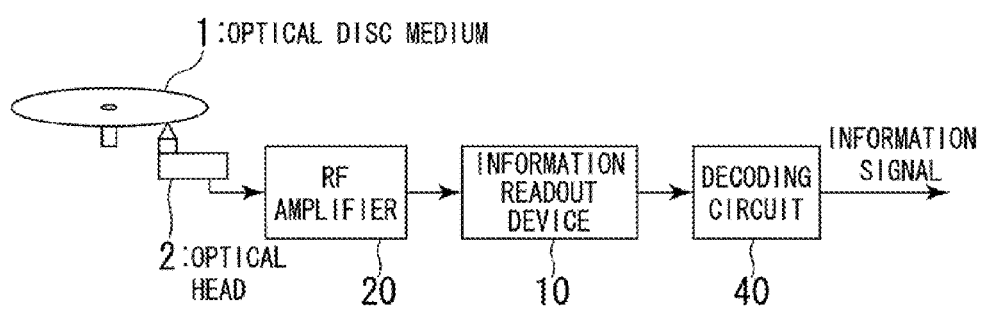
FIG. 8 is a diagram showing an example of a configuration of a signal readout device according to the exemplary embodiment of the present invention.

FIG. 8 is a diagram showing an example of a configuration of a signal readout device according to the exemplary embodiment of the present invention. The signal readout device that reads out an information signal recorded on an optical disc medium includes the information readout device 10 according to the present invention. Therefore, the signal readout device includes: an optical head 2, an RF amplifier 20, the information readout device 10, and a decoding circuit 90. The readout signal is read out from the optical disc medium 1 by the optical head 2, and inputted to the information readout device 10 via the RF amplifier 20. This readout signal is converted by the information readout device 10 into a binary signal, which is outputted to the decoding circuit 90. The binary signal is subjected to decoding processing by the decoding circuit 40 whereby the original information signal is restored.

As codes, not only Read-Solomon codes such as codes 1 to 7 described above but also codes, such as a turbo code or a low density parity check code (LDPC), with a high error correction capability can also be used.

In this manner, without causing great device complication, a binary signal can be obtained from a nonlinear readout signal from the information recording medium. The present invention has been described above referring to the exemplary embodiment, but the present invention is not limited to the exemplary embodiment described above. Various modifications to the configurations and details of the present invention, which are understandable for those skilled in the art, can be made within a scope of the present invention.

The invention claimed is:

1. An information readout device comprising:
   an equalizer configured to include a second-order Volterra filter, and equalize a readout signal read out from an information recording medium to a predetermined characteristic to output said equalization signal; and
   a maximum likelihood detector configured to output a binary signal through maximum likelihood detection based on said equalization signal,
   wherein calculation is performed while the number of second-order terms included in calculation processing by said second-order Volterra filter is limited to three or four, and
   wherein said second-order terms included in said calculation processing by said second-order Volterra filter is expressed by four terms:

$x(k+1-M) \cdot x(k-M)$, $x(k+1-M) \cdot x(k-1-M)$, $x(k-M) \cdot x(k-M)$, and $x(k-M) \cdot x(k-1-M)$, where $x(k)$ is a signal group in which said readout signal is discretized by time and M is a predetermined fixed number.

2. The information readout device according to claim 1, further comprising:
   an adaptive equalizer controller configured to detect a shift of said equalization signal to adjust a tap coefficient of said second-order Volterra filter based on said binary signal.

3. The information readout device according to claim 1, wherein said information recording medium includes an optical disc medium, and wherein said readout signal includes a signal optically read from said optical disc medium.

4. The information readout device according to claim 1, wherein said characteristic of said equalizer includes partial response equalization, and wherein said maximum likelihood detector includes a Viterbi detector performing maximum likelihood detection.

5. An information readout method comprising:
   an equalization step of equalizing a readout signal read out from an information recording medium to a predetermined characteristic to output an equalization signal, wherein said equalization step includes a Volterra filter step of performing calculation processing by a second-order Volterra filter whose number of second-order terms included in calculation processing is limited to three or four; and
   a maximum likelihood detection step of outputting a binary signal through maximum likelihood detection based on said equalization signal, wherein said second-order terms included in said calculation processing by said second-order Volterra filter is expressed by four terms:

$x(k+1-M) \cdot x(k-M)$, $x(k+1-M) \cdot x(k-1-M)$, $x(k-M) \cdot x(k-M)$, and $x(k-M) \cdot x(k-1-M)$, where $x(k)$ is a signal group in which said readout signal is discretized by time and M is a predetermined fixed number.

6. The information readout method according to claim 5, further comprising:
a coefficient control step of detecting a shift of said equalization signal to adjust a tap coefficient of said second-order Volterra filter based on said binary signal.

7. The information readout method according to claim 5, wherein said information recording medium includes an optical disc medium, and wherein said readout signal includes a signal optically read from said optical disc medium.

8. The information readout method according to claim 5, wherein said equalization step includes:
characteristic of said equalizer includes:
a step of equalizing said readout signal to a partial response characteristic, and
wherein said maximum likelihood detection step includes:
a step of performing maximum likelihood detection by Viterbi detection.

9. An information readout device comprising:
an equalizer configured to include a second-order Volterra filter, and equalize a readout signal read out from an information recording medium to a predetermined characteristic to output said equalization signal; and
a maximum likelihood detector configured to output a binary signal through maximum likelihood detection based on said equalization signal,
wherein calculation is performed while the number of second-order terms included in calculation processing by said second-order Volterra filter is limited to two or more and less than five, wherein said second-order terms included in said calculation processing by said second-order Volterra filter is expressed by four terms:

$x(k+1-M) \cdot x(k-M)$, $x(k+1-M) \cdot x(k-1-M)$, $x(k-M) \cdot x(k-M)$, and $x(k-M) \cdot x(k-1-M)$, where $x(k)$ is a signal group in which said readout signal is discretized by time and M is a predetermined fixed number.

10. An information readout method comprising:
an equalization step of equalizing a readout signal read out from an information recording medium to a predetermined characteristic to output an equalization signal, wherein said equalization step includes a Volterra filter step of performing calculation processing by a second-order Volterra filter whose number of second-order terms included in calculation processing is limited to two or more and less than five; and
a maximum likelihood detection step of outputting a binary signal through maximum likelihood detection based on said equalization signal,
wherein said second-order terms included in said calculation processing by said second-order Volterra filter is expressed by four terms:

$x(k+1-M) \cdot x(k-M)$, $x(k+1-M) \cdot x(k-1-M)$, $x(k-M) \cdot x(k-M)$, and $x(k-M) \cdot x(k-1-M)$, where $x(k)$ is a signal group in which said readout signal is discretized by time and M is a predetermined fixed number.

* * * * *